A. R. SILVERSTON.
AIR SHIP.
APPLICATION FILED OCT. 4, 1907.

900,041.

Patented Sept. 29, 1908.
6 SHEETS—SHEET 1.

A. R. SILVERSTON.
AIR SHIP.
APPLICATION FILED OCT. 4, 1907.

900,041.

Patented Sept. 29, 1908.
6 SHEETS—SHEET 2.

Witnesses:

Inventor:
A. R. Silverston
by Brown & Hopkins
Attys

A. R. SILVERSTON.
AIR SHIP.
APPLICATION FILED OCT. 4, 1907.

900,041.

Patented Sept. 29, 1908.
6 SHEETS—SHEET 5.

A. R. SILVERSTON.
AIR SHIP.
APPLICATION FILED OCT. 4, 1907.

900,041.

Patented Sept. 29, 1908.
6 SHEETS—SHEET 6.

Witnesses:

Inventor:

UNITED STATES PATENT OFFICE.

ANTHONY R. SILVERSTON, OF MILWAUKEE, WISCONSIN, ASSIGNOR OF ONE-HALF TO WILLIAM WOODS PLANKINTON, OF MILWAUKEE, WISCONSIN.

AIR-SHIP.

No. 900,041.     Specification of Letters Patent.     Patented Sept. 29, 1908.

Application filed October 4, 1907. Serial No. 395,869.

To all whom it may concern:

Be it known that I, ANTHONY R. SILVERSTON, a citizen of the United States, residing at Milwaukee, in the county of Milwaukee and State of Wisconsin, have invented certain new and useful Improvements in Air-Ships, of which the following is a specification.

This invention relates to improvements in air ships and the primary object of the same is to provide an improved aeroplane attachment for the ship.

A further object is to provide improved means for mounting and improved means for counter-balancing the aeroplane.

A further object is to provide improved means for steadying and counter-balancing the ship.

A further object is to provide an improved device of this character which will be simple, cheap and durable in construction, and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings illustrating the embodiment of the invention, and in which:—

Referring more particularly to the drawings and in the present exemplifications of the invention, the same reference numerals designate the same parts throughout the several views.

The numeral 20 designates generally a tubular body portion, preferably cylindrical in cross section, of any desired size and constructed of any suitable material, such as metal or the like.

Arranged transversely of the forward end of the tubular body portion 20, extending entirely across the end and arranged in a vertical plane is a rudder 21 which is mounted for pivotal movement in suitable bearings 22, which are preferably secured to an encircling ring 23, and said rudder is provided with a slot or enlarged portion 24 preferably adjacent the center thereof. Depending from this rudder 21 is a suitable bar or rod 25 to the free extremity of which is secured a suitable cross arm 26, and connected to the ends of the cross arm are flexible members 27 which are adapted to be wound upon the drum 28 located within the car 29, and said drum is provided with suitable operating handles 30 for rotating the drum and when the drum is rotated, the flexible members 27 will be respectively wound or unwound so as to rock the rudder 21 to deflect the machine.

Figures 2, 3:
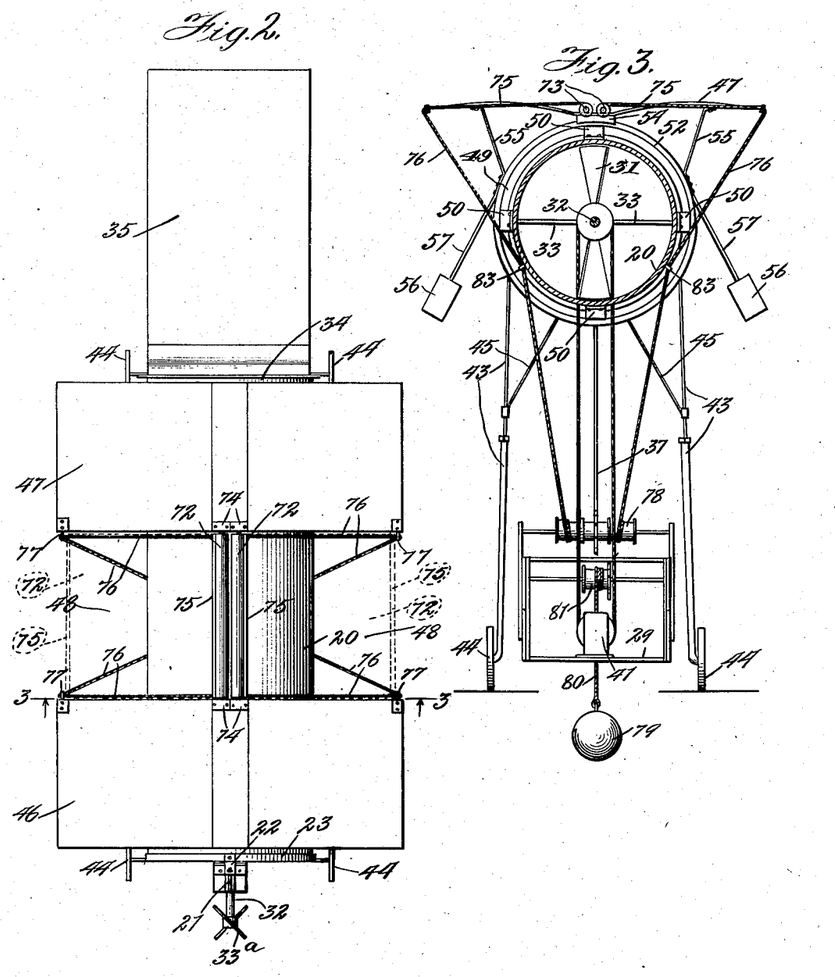
Fig. 2 is a top plan view of Fig. 1, showing the flexible aeroplanes out of operative position.
Fig. 3 is a sectional view on line 3—3 of Fig. 2 showing the flexible aeroplanes in an operative position.

The body portion 20 is open at both ends and any suitable means may be provided within the tubular portion to draw the air into the forward end thereof and discharge the same through the rear end at a greater rate of speed than the speed of the outside air. A suitable and efficient means for accomplishing this purpose comprises a motor of any desired construction preferably of the shape of a fan or motor 31, which is located preferably at a point intermediate the ends of the tubular body portion. The diameter of the fan or motor is of a size slightly less than the interior diameter of the body portion 20 so that the fan or motor will substantially fill or extend across the body portion without interfering with the operation thereof. This fan or motor is preferably secured for rotation upon a suitable shaft 32 which extends longitudinally through the body portion and is journaled in suitable bearings held in position by means of braces or rods 33, shown more clearly in Fig. 3 of the drawings, and said shaft is preferably located at the diametric center of the tubular body portion.

One extremity of the shaft 32 preferably extends beyond the forward extremity of the tubular body portion 20 and through the slot 24 in the rudder 21 so that the shaft will not interfere with the oscillation of the rudder. Secured to the extremity of the shaft 32 and in advance of the rudder 21 is a fan or motor 33$^a$, of any suitable size and diameter, which assists in propelling the machine in the manner to be hereinafter set forth.

Pivotally secured by one end and in any suitable manner, preferably to an encircling ring 34 which is located adjacent the rear extremity of the body portion are a pair of deflectors or members 35 which are preferably spaced from and are parallel with each other, one of which is preferably located adjacent the top and the other adjacent the bottom of the discharge end of the body portion and said deflectors or members are preferably of a size to extend across the end and to project for some distance beyond the body portion in a direction transverse to the rudder 21. These deflectors or members may be constructed of any suitable material and are preferably connected at their sides by suitable flexible members 36 so as to form a tubular pivoted portion adjacent the discharge end of the body portion and which is open at its free end to permit the air discharged from the body portion to pass freely therethrough.

Any suitable means may be provided for moving the deflectors or members 35 about their points of pivotal support either downwardly or upwardly, to respectively direct the machine upwardly or downwardly. A suitable and efficient means for accomplishing this purpose comprises a bar or rod 37, one end of which is suitably secured to the members 35 and the other extremity is connected to one arm of a bell crank lever 38, suitably supported by the car 29, and connected to the other arm of the bell crank lever is a flexible member 39, one extremity of which is adapted to be wound around a suitable drum located in the car 29 so that when the flexible member 47 is wound around the drum 40 or paid out thereform, the members 35 will be accordingly deflected.

Located within the car 29 is a suitable power device which is connected by means of a belt 42 in any suitable manner to the shaft 32 and is adapted to impart motion to the shaft to rotate the fans or motors 31, 32.

A series of legs 43, preferably comprising telescoping sections, may be provided for supporting the machine to permit it to move upon the surface of the ground when desired. The extremity of one of the sections of the legs may be secured to the tubular body portion, preferably by means of the encircling rings 23, 34, and journaled to the free extremities of the other sections are suitable rollers 44, and the sections of the legs are of such a length that the rollers or wheels 44 will project below the bottom of the car 29 to support the latter out of contact with the surface of the ground. Suitable braces 45 may be provided for the arms or legs, if desired.

All of the above parts may be of any desired construction and although the preferred forms and constructions thereof have been specifically described, they form no part of the present application.

Figure 1:
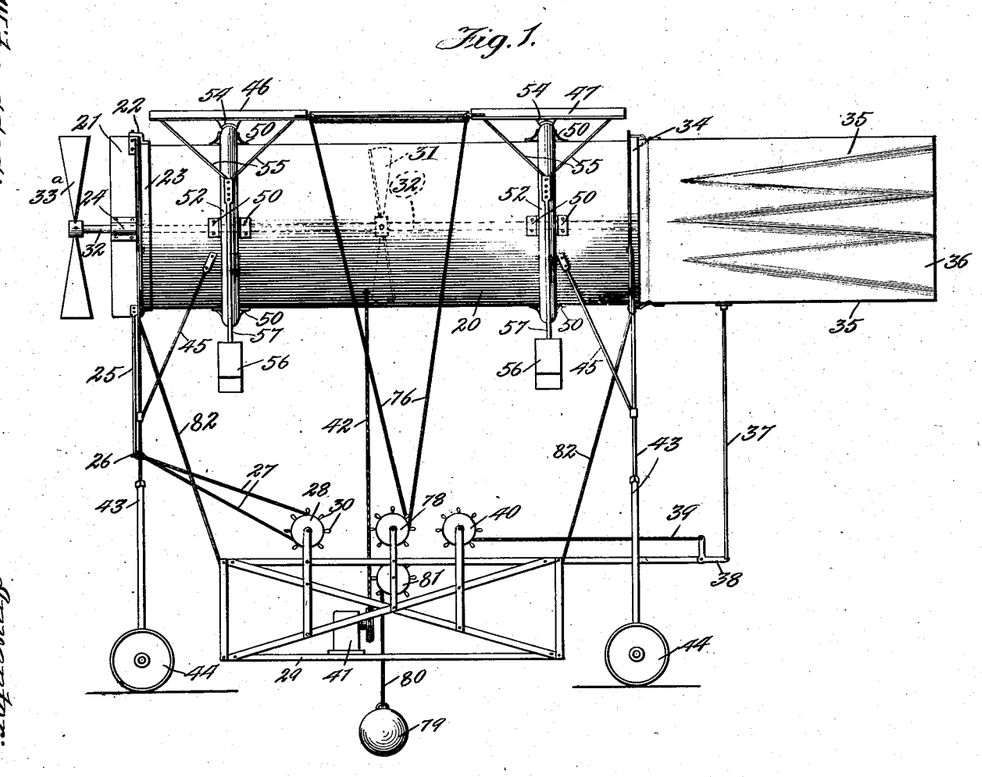
Figure 1 is a side elevation of an improved machine of this character constructed in accordance with the principles of this invention.

The operation of this portion of the machine, briefly stated, is as follows: Assuming the parts to be in the position shown in Fig. 1 of the drawings the power device 41 may be started, which will drive the fan or motor 31, the latter creating a partial vacuum at the inlet end of the body portion to suck the outside air into the end thereof, the motor or fan being rotated at a rate of speed as much in excess of the speed of the outside air as it is desired the machine shall travel in flight when in mid air. The air drawn into the body portion by the fan or motor 31 will be discharged through the other end thereof and by deflecting the members 35 in the proper direction, the forward end of the tubular body portion will be raised and as the air is drawn into the body portion by the fan the suction created thereby will cause the machine to "climb" or be sucked upwardly until the desired height is reached, after which the operator may then adjust the deflectors or members 35 to the proper position to discharge the air directly to the rear of the machine or in a substantially straight line. The fan or motor 33, located in advance of the body portion, will assist in directing the air into the inlet end thereof, and during the flight of the machine it may be deflected so as to change its course of travel by means of the rudder 31.

Suitable aeroplanes 46, 47, may be provided and secured for bodily or pivotal movement to the tubular body portion 20 and are arranged transversely with respect to the body portion so as to project for some distance beyond the sides thereof. In the present exemplification of the invention these aeroplanes 46, and 47 are preferably spaced from each other, as shown more clearly in Figs. 1 and 2 of the drawings, and one of which is located respectively adjacent the inlet and the discharge end of the tubular body portion so as to form an intervening space 48 between the aeroplanes. These aeroplanes are preferably located in the same plane with each other and may be supported for pivotal movement upon and counterbalanced with respect to the tubular body portion 20 in any desired or suitable manner. A suitable and efficient means and the preferred manner of accomplishing this purpose will now be described and as both of the aeroplanes are mounted and counterbalanced in the same manner, the description of one will apply equally as well to the other.

Figure 4:
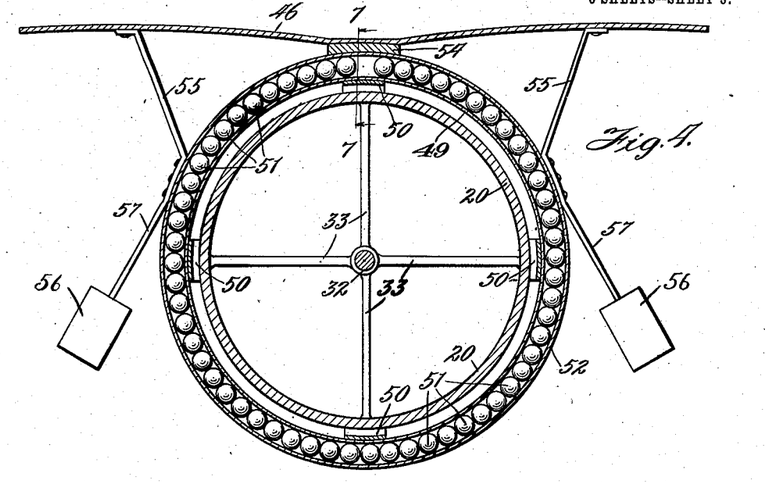
Fig. 4 is an enlarged detail sectional view showing the preferred manner of mounting the aeroplanes on the body portion.

Secured to and encircling the periphery of the tubular body portion is a suitable track or guide-way 49, which is preferably spaced from the periphery thereof and held in position by means of suitably spaced brackets or supports 50 and located within the track or guide-way 49 are balls 51, and surrounding the track or guide-way 49 and spaced therefrom is a ring 52, preferably in the form of a similar track or guide-way, which is adapted to rest upon the balls 51 and coöperate with the track or guide-way 49 to form a housing or race-way for the balls. This ring 52 may be prevented from lateral displacement with relation to the track or guide-way 49 in any desired or suitable manner, preferably by means of ears or projections 53 on the brackets or supports 50 and a suitable support 54 may be provided for securing the aeroplane 46 to the track or guide-way 52 so that when the track or guide-way 52 moves around the tubular body portion 20, the aeroplane supported thereby will also be moved in the same relative direction. Suitable braces or supports 55 may be provided and adapted to engage the aeroplanes and the track or guide-way 52 for supporting the free ends of the aeroplane. Counter-balancing weights 56 are provided for counter-balancing the aeroplane and said weights are secured to the track or guide-way 52 by means of suitable arms 57, which latter may, if desired, be continuations of the braces or supports 55 and the arms 57 are of such a length that the counter-balancing weights 56 will be located below the diametric center of the tubular body portion 20.

Figure 5:
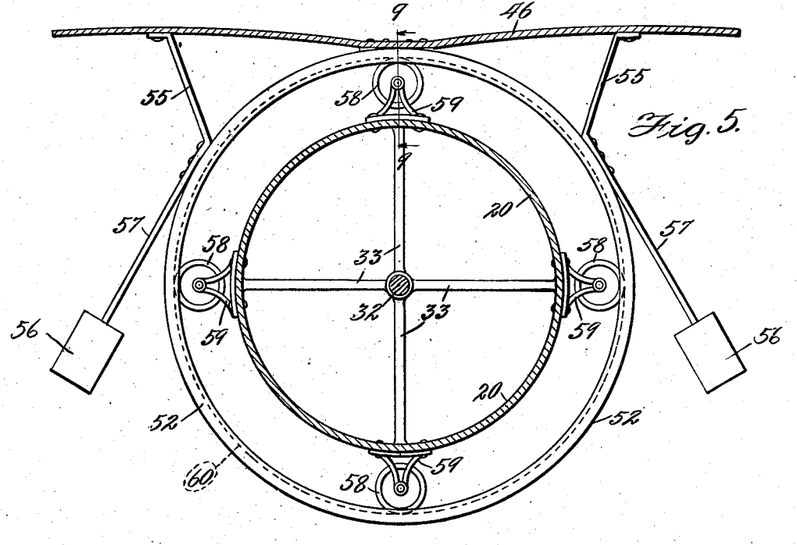
Fig. 5 is a view similar to Fig. 4 showing a modified form of mounting.
Figures 6, 7, 8, 9:
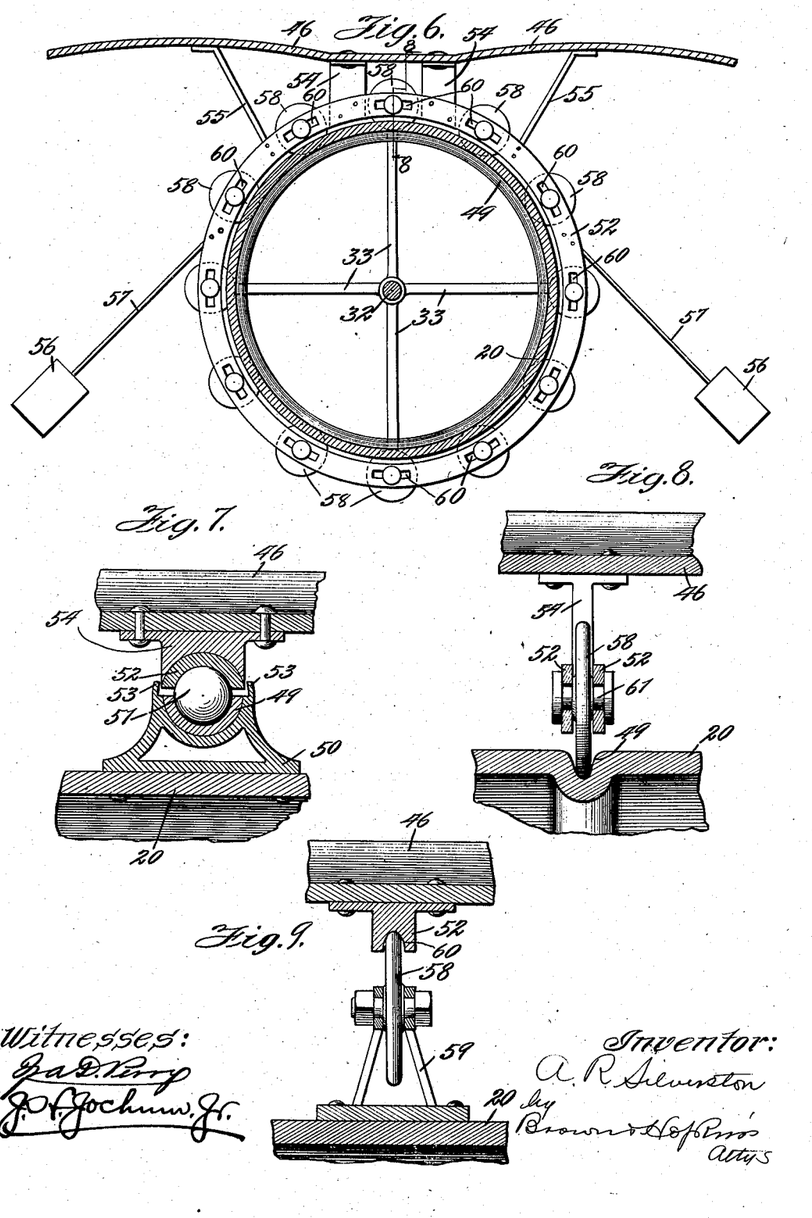
Fig. 6 is a view similar to Fig. 4 showing another modified form of mounting.
Fig. 7 is a detail sectional view on line 7—7 of Fig. 4.
Fig. 8 is a detail sectional view on line 8—8 of Fig. 6.
Fig. 9 is a detail sectional view on line 9—9 of Fig. 5.

In the exemplification shown in Fig. 5 of the drawings, the ring 52 is spaced from the tubular body portion 20 and supported in position by means of suitable rollers 58 which are journaled in suitable bearings 59 secured to the periphery of the tubular body portion 20 and is held from lateral displacement by means of the track or guide-way 60 in the face thereof, which is adapted to receive the periphery of the rollers 58, as shown more clearly in Fig. 9 of the drawings.

In the exemplification shown in Figs. 6 and 8 of the drawings, the track or guide-way 49 is formed by a circumferential depressed portion in the tubular body 20, in which the rollers 58 are adapted to run. These rollers 58 may be supported in any desired or suitable manner, such as by means of the spaced encircling ring 52, which in this exemplification of the invention are provided with a series of slots 60 into which the journals 61 of the rollers 58 are mounted and the rings are of a diameter slightly larger than the exterior diameter of the tubular body portion 20, so that the rings will be held out of engagement with the periphery of the tubular body portion but will hold the rollers 58 in the track or guide-way 49. The aeroplane 46 is secured to the rings 52 by means of the supports 54.

Figure 10:
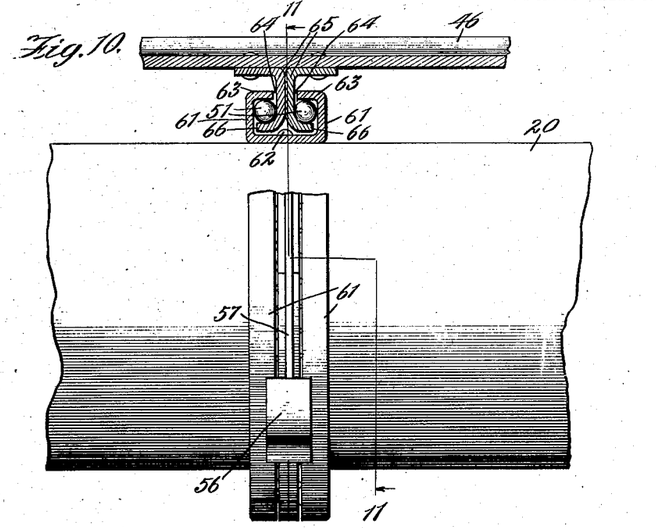
Fig. 10 is a detail elevation, partly in section, of a modified form of mounting.
Figure 11:
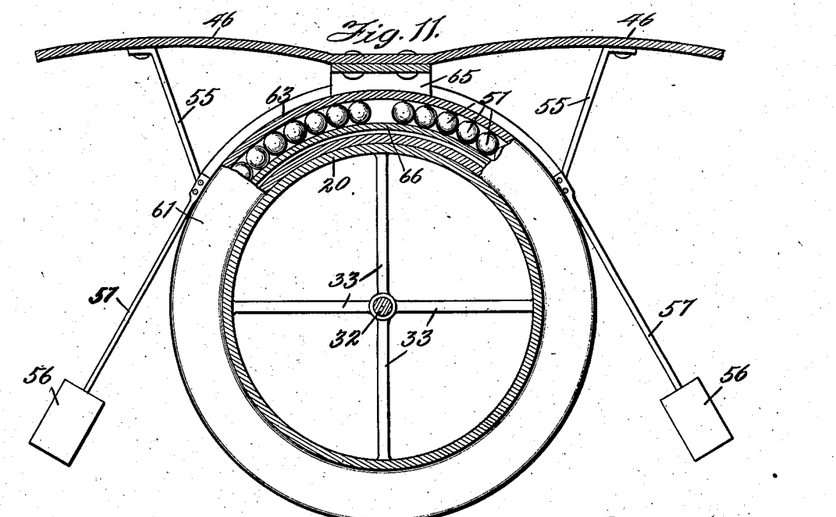
Fig. 11 is a detail sectional view on line 11—11 of Fig. 10.

In the exemplification shown in Figs. 10 and 11, the track or guide-way 49 is formed by means of an encircling channel shaped member 61, which is secured in any desired manner to the periphery of the tubular body portion 20 by means of bolts or rivets 62. The upper extremities 63 of the channel shaped member 61 are deflected towards each other to form an opening 64. The encircling ring in this exemplification of the invention preferably comprises two members 65, one extremity of which are secured to the aeroplane 46 and the other extremities 66 thereof are deflected away from each other, as shown in Fig. 10 so that when the body portion of the members 65 stand within the opening 64 of the encircling member 61, the extremities 66 thereof will be spaced from the extremities 63 of the member 61 to form race-ways between the respective extremities for the balls 51, the balls resting upon the upper face of the extremities 66 of the members 65 and below the extremities 63 of the member 61.

Figure 12:
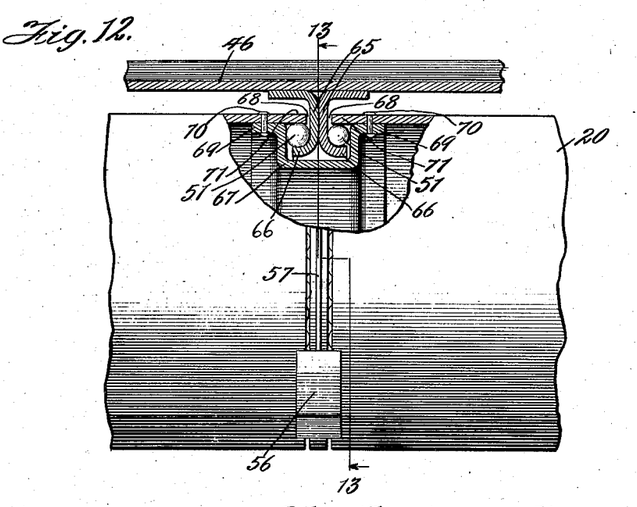
Fig. 12 is a detail elevation, partly in section, of still another modified form of mounting.
Figure 13:
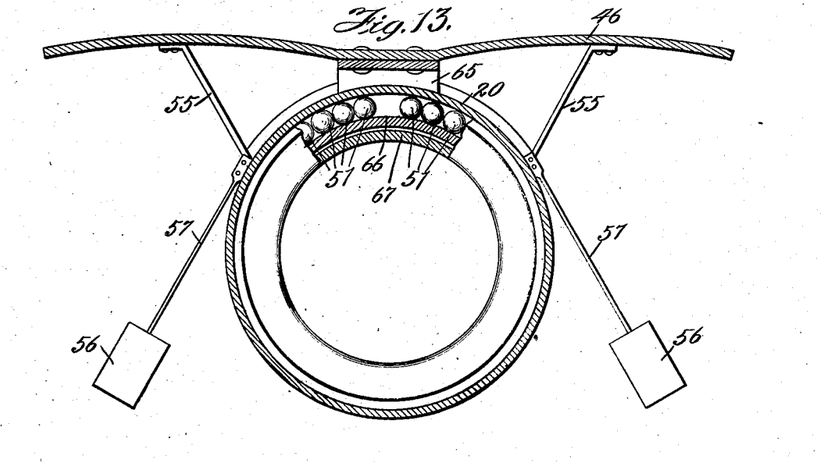
Fig. 13 is a detail sectional view on line 13—13 of Fig. 12.

In the exemplification shown in Figs. 12 and 13 of the drawings, the tubular body portion 20 is preferably formed of spaced sections arranged end to end and are connected by means of a channel-shaped member 67 arranged within the sections so as to stand astride of the space 68 formed therebetween and may be secured in position in any desired or suitable manner, preferably by means of the flanged extremities 69 thereof, which are secured to the respective sections of the tubular body portion 20 in any desired or suitable manner, preferably by means of bolts or rivets 70 passing through the respective section 20 and flange 69. In this exemplification of the invention the body portions of the members 65 of the encircling ring are adapted to stand within the space 68 so that the flanged extremities 66 of the members 65 will be located within the channel shaped members 67 and will be spaced from the overhanging or projecting portion 71 of the tubular body portion 20 so that the balls 51 will rest upon and be supported by the upper faces of the extremities 66 of the members 65 of the encircling ring, which extremities form a support therefor so as to engage the overhanging or projecting portions 71.

It will thus be seen that the aeroplanes are supported for independent pivotal movement with relation to the body portion 20 so that in the event of the outside air currents striking the machine transversely with relation to its line of travel, the aeroplane will assume a proper position with relation to the body portion to prevent the machine from being blown over. Arranged between the aeroplanes 46 and 47 is an adjustable aeroplane which preferably comprises two sections 72 of any suitable flexible material, such as fabric or the like, which are adapted to be wound upon suitable spring rollers 73 journaled in suitable bearings 74, supported respectively by the aeroplanes 46 and 47. Secured to the outer ends of the flexible members 72 is a rod or bar 75 and secured respectively to the extremities of said rods or bars are flexible members 76, such as cords, ropes or the like, which pass through suitable eyes or guides 77 secured respectively to the outer adjacent extremities of the aeroplanes. The free ends of these flexible members 76 are adapted to be wound upon a suitable drum 78 mounted within the car 29 so that when the flexible members are wound upon the drum, the flexible aeroplanes 72 will be unwound from the rollers 73 and against the tension of the controlling spring thereof so as to fill the space 48 between the aeroplanes 46 and 47 to serve as an additional means to prevent a too rapid descent of the machine. When it is desired that these flexible aeroplanes shall not be used, the flexible members 76 may be unwound from the drum 78 and the springs of the rollers 73 will cause the flexible aeroplanes 75 to be wound upon the rollers. It will thus be seen that with this improved construction of aeroplane attachment, the aeroplanes will automatically assume a proper position with relation to the tubular body portion and that they will at all times be counter-balanced by means of the weights 56 no matter in what position the aeroplanes may be with relation to the body portion.

In order to steady the ship a suitable suspended counter-balancing or ballast weight 79 may be provided and said weight may be attached to the ship so as to depend from the bottom of the car by means of a suitable flexible member 80, such as a rope, chain or the like, which is adapted to be wound upon a suitable drum 81 located within the car 29, the flexible member 80 being adapted to be wound or unwound upon the drum to raise or lower the ballast weight 79 to any desired position below the ship to hold the latter steady in its flight.

The car 29 may be suspended from the tubular body portion 20 preferably by members 82, one end of which are secured to the car and the other ends may be secured to the tubular body portion 20 in any desired or suitable manner, preferably by means of the encircling rings 23, 34. If desired, the flexible members 66 may pass through suitable guides 83 supported by the tubular body portion 20 whereby the flexible members may be held close to the body portion.

In order that the invention might be fully understood by those skilled in the art the details of the foregoing embodiments thereof have been thus specifically described, but

What I claim as new and desire to secure by Letters Patent is—

1. In combination in an air ship, a tubular body portion, and a bodily adjustable transverse aeroplane supported by and extending longitudinally of the tubular body.

2. In combination in an air ship, a tubular body portion, and an adjustable transverse aeroplane supported by and movable about the body as an axis.

3. In combination in an air ship, a tubular body portion, and a transverse aeroplane supported by and movable about the body as an axis.

4. In combination in an air ship, a tubular body portion, a transverse aeroplane supported by and movable about the body as an axis, and means for preventing displacement of the aeroplane with relation to the body.

5. In combination in an air ship, a tubular body portion, an aeroplane arranged transversely of the body, and a support for the aeroplane, said support being mounted upon and rotatable about the body as an axis.

6. In combination in an air ship, a tubular body portion, an aeroplane arranged transversely of the body, a support for the aeroplane, said support being mounted upon and rotatable about the body as an axis, and means for preventing longitudinal displacement of the support.

7. In combination in an air ship, a tubular body portion, a transverse aeroplane supported by and movable about the body as an axis, and means for maintaining the equilibrium of said aeroplane.

8. In combination in an air ship, a tubular body portion, a transverse aeroplane supported by and extending longitudinally of the tubular body, means whereby the aeroplane will be bodily movable about the body portion as an axis, and means for maintaining the equilibrium of the aeroplane.

9. In combination in an air ship, a tubular body portion, a transverse aeroplane supported by and extending longitudinally of the tubular body, means whereby the aeroplane will be bodily movable about the body portion as an axis, means for maintaining the equilibrium of the aeroplane, and means for preventing longitudinal displacement of the aeroplane with relation to the tubular body portion.

10. In combination in an air ship, a tubular body portion, a member supported for movement around the body, a transverse aeroplane supported for bodily movement with the member, and a roller bearing between the body and the said member.

11. In combination in an air ship, a tubular body portion, a member supported for movement around the body, a transverse aeroplane supported for bodily movement with the member, a roller bearing between the body and the said member, and means for preventing displacement of the said member.

12. In combination in an air ship, a tubular body portion, a member surrounding and movable around the body as an axis, a transverse aeroplane supported by the member and for bodily movement therewith, a roller bearing disposed between the body and the member, and means for preventing longitudinal displacement of the member and the bearing with relation to the body portion.

13. In combination in an air ship, a tubular body portion, a member supported for movement around the body, a transverse aeroplane supported for bodily movement with the member, a roller bearing between the body and the member, and means for maintaining the equilibrium of the aeroplane.

14. In combination in an air ship, a tubular body portion, a member supported for movement around the body, a transverse aeroplane supported for bodily movement with the member, a roller bearing between the body and the member, and means operatively related to the said member for maintaining the equilibrium of the aeroplane.

15. In combination, in an air ship, a tubular body portion, a member supported for movement around the body, a transverse aeroplane supported for bodily movement with the member, a roller bearing between the body and the member, and weighted arms operatively related to the said member for maintaining the equilibrium of the aeroplane.

16. In combination in an air ship, a tubular body portion, a member supported for bodily movement around the body, a transverse aeroplane supported for bodily movement by the member and extending longitudinally of the body, a roller bearing between the body and member, and weighted arms operatively related to the member for maintaining the equilibrium of the aeroplane.

17. In combination in an air ship, a tubular body portion, a member supported for bodily movement around the body, a transverse aeroplane supported for bodily movement by the member and extending longitudinally of the body, a roller bearing between the body and member, weighted arms operatively related to the member for maintaining the equilibrium of the aeroplane, and means for preventing longitudinal displacement of the parts with relation to the body portion.

18. In combination in an air ship, a tubular body, a transverse aeroplane supported for bodily movement around the body, means for maintaining the equilibrium of the aeroplane, and separate means for counterbalancing the ship.

19. In combination in an air ship, a tubular body, a transverse aeroplane supported for bodily movement around the body, means for maintaining the equilibrium of the aeroplane, separate means for counterbalancing the ship, and means for controlling the last said means.

20. In combination in an air ship, a tubular body portion, transverse aeroplanes supported by the body, and spaced from each other, means for maintaining the equilibrium of the aeroplanes, and an adjustable aeroplane disposed between the first two said aeroplanes.

21. In combination in an air ship, a tubular body portion, transverse aeroplanes supported by the body and spaced from each other, means for maintaining the equilibrium of the aeroplanes, an adjustable aeroplane disposed between the first two said aeroplanes, and means for controlling the adjustable aeroplane.

22. In combination in an air ship, a tubular body portion, transverse aeroplanes supported by the body and spaced longitudinally from each other, means for maintaining the equilibrium of said aeroplanes, a flexible aeroplane adapted to fill the space between the first two said aeroplanes, and means for controlling the flexible aeroplane.

23. In combination in an air ship, a tubular body portion, transverse aeroplanes supported by the body, means for maintaining the equilibrium of said aeroplanes, a flexible aeroplane, and means whereby said flexible aeroplane may be placed into and out of operative position.

24. In combination in an air ship, a tubular body portion, transverse aeroplanes supported by the body, counterbalancing means for maintaining the equilibrium of the aeroplanes and means whereby the flexible aeroplane may be placed into and out of operative position with relation to the first two said aeroplanes, the equilibrium of the flexible aeroplane when in operative position being also maintained by the said counterbalancing means.

25. In combination in an air ship, a tubular body portion, transverse aeroplanes supported by the body and spaced from each other, means for maintaining the equilibrium of the aeroplanes, a flexible aeroplane adapted to fill the space between the first two said aeroplanes, and spring actuated means for controlling the flexible aeroplane.

26. In combination in an air ship, a tubular body portion, transverse aeroplanes supported by the body, and spaced from each other, means for maintaining the equilibrium of the aeroplanes, a flexible aeroplane adapted to be moved into and out of operative position between the first two said aeroplanes, means for moving the said flexible aeroplane into one of its positions, and spring controlled means for moving it into its other position.

27. In combination in an air ship, a tubular body portion, longitudinally spaced transverse aeroplanes supported by the body and arranged in the same plane, means for maintaining the equilibrium of said aeroplanes, a flexible aeroplane, means for moving said aeroplane into operative position within the space between the first two said aeroplanes and in the same plane therewith, and automatic means for moving the flexible aeroplane out of operative position.

28. In combination in an air ship, a tubular body portion, longitudinally spaced transverse aeroplanes supported by the body and located in the same plane, means for maintaining the equilibrium of the aeroplanes, a spring controlled roller supported by and between the first two said aeroplanes, a flexible aeroplane adapted to be automatically wound upon the roller, and means for unwinding the aeroplane from the roller and against the tension thereof to fill the space between the first two said aeroplanes.

29. In combination in an air ship, a tubular body portion, longitudinally spaced transverse aeroplanes supported by the body and located in the same plane, means for maintaining the equilibrium of the aeroplanes, a spring controlled roller supported by and between the first two said aeroplanes, a flexible aeroplane adapted to be automatically wound upon the roller, means for unwinding the flexible aeroplane from the roller and against the tension thereof to fill the space between the first two said aeroplanes, and means for supporting the free end of the flexible aeroplane.

30. In combination in an air ship, a tubular body portion, longitudinally spaced transverse aeroplanes supported by the body and located within the same plane, counterbalancing means for maintaining the equilibrium of said aeroplanes, a spring controlled roller supported by and between the first two said aeroplanes, a flexible aeroplane adapted to be automatically wound upon the roller, means for unwinding the flexible aeroplane from the roller and against the tension thereof to fill the space between the first two said aeroplanes, and means for supporting the free end of the flexible aeroplane, the said flexible aeroplane being located in the same plane with the first two said aeroplanes and the equilibrium thereof being maintained by the said counterbalancing means.

31. In combination in an air ship, a supporting member, and a bodily adjustable transverse aeroplane supported by and extending longitudinally of said member.

32. In combination in an air ship, a support and an adjustable transverse aeroplane supported by and for bodily movement about the support as an axis.

33. In combination in an air ship, a support, a transverse aeroplane supported by and bodily movable about said support as an axis, and means for preventing displacement of the aeroplane with relation to the said support.

34. In combination in an air ship, a supporting member, an aeroplane arranged transversely of the member, and a support for the aeroplane, said support being mounted upon and bodily rotatable about the said member as an axis.

35. In combination in an air ship, a support, a transverse aeroplane supported by and bodily movable about the said support as an axis, and means for maintaining the equilibrium of said aeroplane.

36. In combination in an air ship, a support, a transverse aeroplane supported thereby, means whereby the aeroplane will be bodily movable about the support as an axis, means for maintaining the equilibrium of the aeroplane and means for preventing longitudinal displacement of the aeroplane with relation to the support.

37. In combination in an air ship, a support, a member supported for movement therearound, a transverse aeroplane supported for bodily movement with the member, and a roller bearing between the support and the said member.

38. In combination in an air ship, a support, a member supported for movement therearound, a transverse aeroplane supported for bodily movement with the member, a roller bearing between the support and the member, and means for maintaining the equilibrium of the aeroplane.

39. In combination in an air ship, a support, a member supported for movement therearound, a transverse aeroplane supported for bodily movement with the member, a roller bearing between the support and the member, and weighted arms operatively related to the said member for maintaining the equilibrium of the aeroplane.

40. In combination in an air ship, a support, a transverse aeroplane supported for bodily movement therearound, means for maintaining the equilibrium of the aeroplane, and separate means for counterbalancing the ship.

41. In combination in an air ship, a support, a transverse aeroplane supported for bodily movement therearound, means for maintaining the equilibrium of the aeroplane, separate means for counterbalancing the ship, and means for controlling the last said means.

42. In combination in an air ship, a support, transverse aeroplanes supported thereby and spaced from each other, means for maintaining the equilibrium of the aeroplanes and an adjustable aeroplane disposed between the first two said aeroplanes.

43. In combination in an air ship, a support, transverse aeroplanes supported thereby and spaced from each other, means for maintaining the equilibrium of the aeroplanes, an adjustable aeroplane disposed between the first two said aeroplanes, and means for controlling the adjustable aeroplane.

44. In combination in an air ship, a support, transverse aeroplanes supported thereby and spaced longitudinally from each other, means for maintaining the equilibrium of said aeroplanes, a flexible aeroplane adapted to fill the space between the first two said aeroplanes, and means for controlling the said flexible aeroplane.

45. In combination in an air ship, a support, transverse aeroplanes supported thereby, and spaced longitudinally from each other, means for maintaining the equilibrium of said aeroplanes, a flexible aeroplane adapted to fill the space between the first two said aeroplanes, and means whereby the flexible aeroplane may be placed into and out of operative position.

46. In combination in an air ship, a support, transverse aeroplanes supported thereby, and spaced longitudinally from each other, means for maintaining the equilibrium of said aeroplanes, a flexible aeroplane adapted to fill the space between the first two said aeroplanes, and means whereby the flexible aeroplane may be placed into and out of operative position with relation to the first two said aeroplanes, the equilibrium of the flexible aeroplane when in operative position being also maintained by the said counterbalancing means.

47. An air ship including in combination a support, and an aeroplane arranged transverse to the line of flight of the machine, and bodily adjustable with relation to the support.

In testimony whereof I have signed my name to this specification, in the presence of two subscribing witnesses, on this 15th day of July A. D. 1907.

ANTHONY R. SILVERSTON.

Witnesses:
 JEREMIAH QUIN,
 G. RISK.